United States Patent [19]

McCarty et al.

[11] 3,787,637

[45] Jan. 22, 1974

[54] ANNOUNCING SYSTEM

[75] Inventors: John O. McCarty, Atlanta; Leary W. Smith, Chamblee, both of Ga.

[73] Assignee: The Audichron Company, Atlanta, Ga.

[22] Filed: July 26, 1971

[21] Appl. No.: 165,902

[52] U.S. Cl. 179/100.2 MD, 174/6 C, 179/100.1 C, 179/100.2 C, 179/100.2 S, 274/4 J, 274/17

[51] Int. Cl. ..... G11b 5/74, G11b 5/56, G11b 23/18

[58] Field of Search ............179/100.1 R, 100.1 C, 179/100.1 DR, 6 C, 100.2 R, 100.2 MD, 100.2 MP, 100.3 B, 100.3 D, 100.2 S; 274/45, 17, 21, 22, 40, 44

[56] References Cited

UNITED STATES PATENTS

| | | | |
|---|---|---|---|
| 3,495,046 | 2/1970 | Camyas | 179/100.2 C |
| 3,513,265 | 5/1970 | Camyas et al. | 179/100.2 C |
| 2,645,494 | 7/1953 | Keller | 179/100.2 R |
| 2,974,960 | 3/1961 | Hyatt | 274/4 J |
| 2,109,627 | 3/1938 | Finch | 179/100.3 B |
| 3,488,443 | 1/1970 | Smith | 179/100.2 MD |

FOREIGN PATENTS OR APPLICATIONS

| | | | |
|---|---|---|---|
| 662,462 | 12/1951 | Great Britain | 179/100.2 MP |

OTHER PUBLICATIONS

Tape Recorder Manual, Vol. 3, Section 24, pages 7 and 12, Jan. 1959.

*Primary Examiner*—Raymond F. Cardillo, Jr.
*Attorney, Agent, or Firm*—Jones, Thomas & Askew

[57] ABSTRACT

An announcing system for providing recorded messages to a telephone system comprising a driving pulley, a driven pulley, an endless record belt extending about the pulleys, a flywheel connected to the driven pulley, a motor connected to the driving pulley, and dampening means for dampening the motor vibrations from the driven pulley. A plurality of banks of reading heads are mounted adjacent the driven pulley and are arranged to read the message tracks on the record belt as the record belt moves about the driven pulley, and switches are actuated by depressions in the record belt as the depressions pass around the driving pulley. The switches connect and disconnect the telephone system to the reading heads in timed relationship with the messages imposed on the record belt.

7 Claims, 6 Drawing Figures

INVENTORS
JOHN O. McCARTY
LEARY W. SMITH

BY Jones & Thomas
ATTORNEYS

ANNOUNCING SYSTEM

BACKGROUND OF THE INVENTION

Various announcing systems have been developed for the purpose of providing messages to telephone systems whereby a caller can call certain numbers and receive the recorded message. Such systems are in common use by telephone companies and other businesses, where, for example, the telephone number of a business establishment has been changed and a message must be provided to the people calling the old number. The message provided by the announcing system in such a situation usually informs the caller that the number he has reached is no longer an operating number, of the new telephone number, or that he must dial again, etc.

Most of the previously developed announcing systems are large in size and are expensive to construct and maintain. The size and expense of the prior announcing systems increase as the quality of the message tone increases and as the number of messages provided by the system increases. The sound quality is affected by the vibrations and surging encountered between the reading heads and the record. In order to eliminate the vibrations between the reading head and the recording medium, the driving motor, the driving gears and the bearings usually are carefully constructed, and frequently include special vibration dampening devices. In addition, since surging in the movement of the recording medium past the reading head also results in audio distortion, the driving motor and gear mechanism utilized to impart movement to the recording medium also are carefully constructed so as to provide constant speed to the recording medium.

While the quality of the message provided by the announcing system is one of the principal concerns to both the manufacturer and purchaser of an announcing system, it is also important that an announcing system be easily and inexpensively maintained, such as by being able to expediently replace the portions thereof which are subject to wear.

SUMMARY OF THE INVENTION

Briefly described, the present invention comprises an audio output system or an announcing system which includes driving and driven pulleys, an endless record belt extending about the pulleys and which drives the driven pulley from the driving pulley, a driving motor connected to the driving pulley, and a flywheel connected to the driven pulley. The motor is mounted to the framework of the system on vibration dampening elements so that the vibration of the motor and driving pulley are substantially isolated from the driven pulley, and the flywheel and natural resiliency of the record belt function to substantially eliminate surging in the portion of the record belt which extends about the driven pulley. The reading heads are mounted at the driven pulley and function to read the messages from the record belts as the record belt passes about the driven pulley. The arrangement provides for the use of an inexpensive motor, gear system and bearing system since the vibrations and surging of these elements are not transmitted to the portion of the record belt which is read by the reading heads.

Thus, it is an object of this invention to provide an announcing system which is inexpensive to construct and maintain, which provides messages that are substantially free of distortion in sound quality due to record belt surge or vibration, and which provides continuous duty reliability.

Another object of this invention is to provide an announcing system for transmitting audible messages to a telephone system or the like, which is of small size, which has a large message capacity, and which is versatile in providing messages which vary in time duration.

Other objects, features and advantages of the present invention will become apparent upon reading the following specification when taken into conjunction with the accompanying drawing.

DESCRIPTION OF A PREFERRED EMBODIMENT

Figure 1:
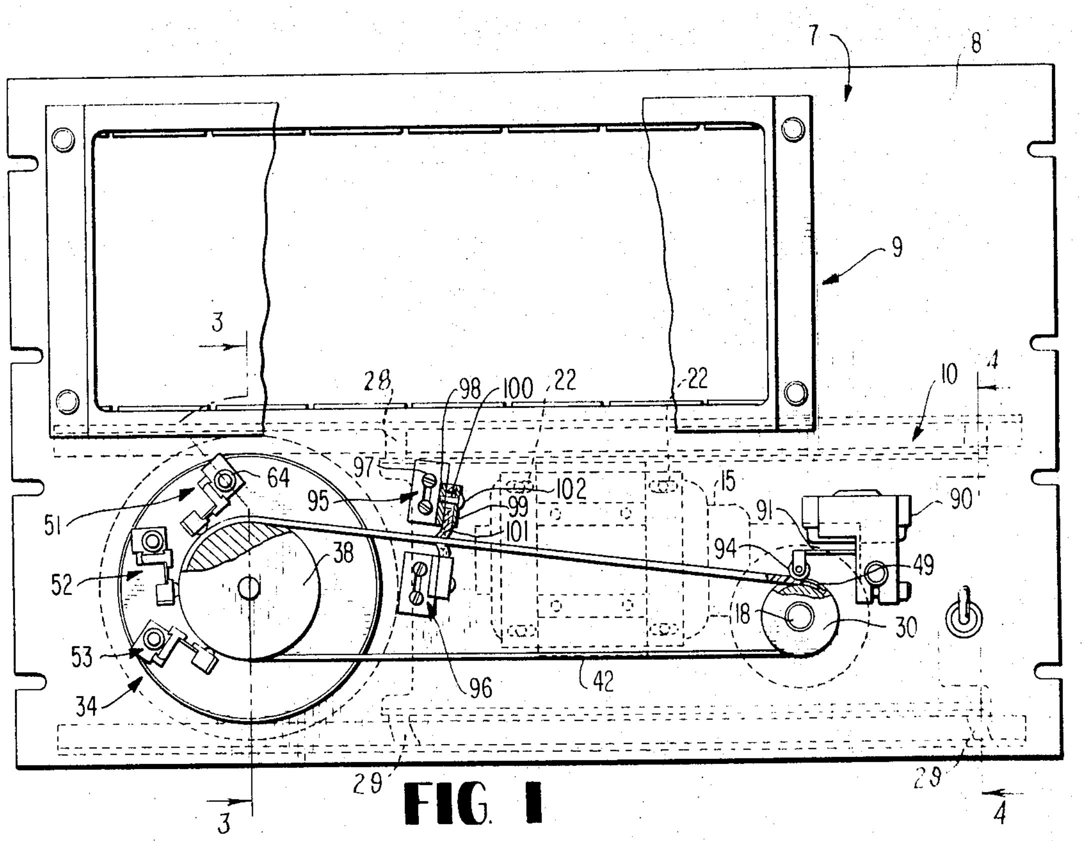
FIG. 1 is a front elevational view of the announcing system.
Figure 2:
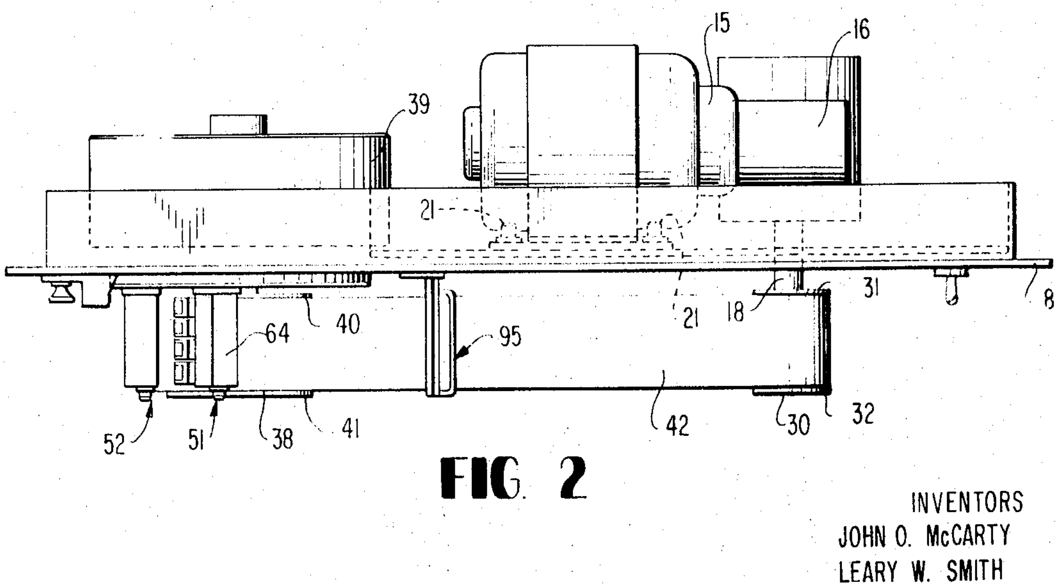
FIG. 2 is a top view of the announcing system.
Figure 4:
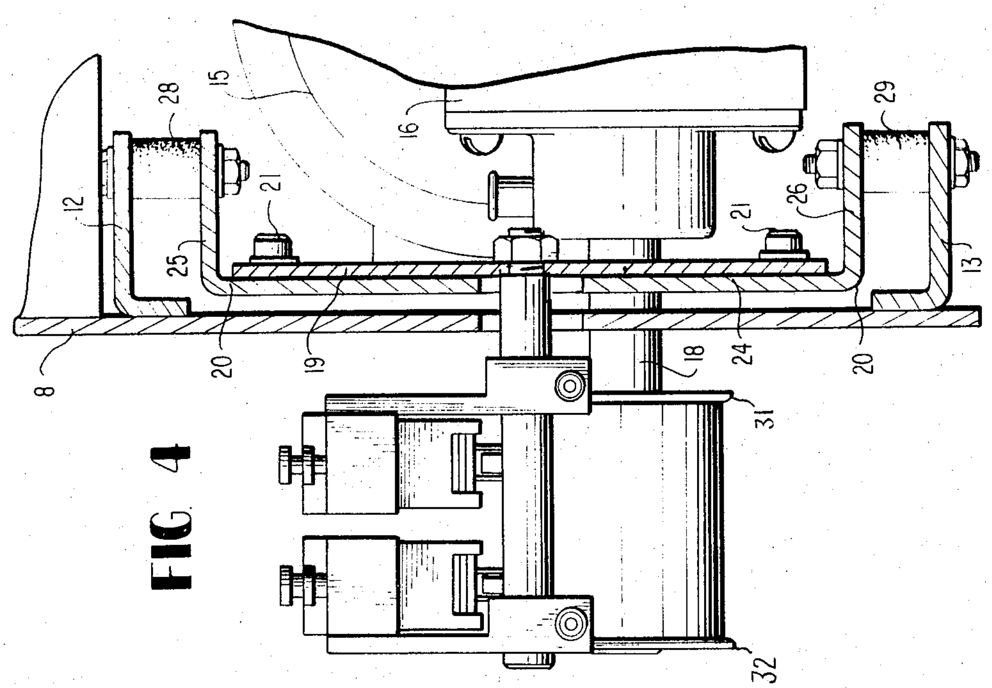
FIG. 4 is an end view of the announcing system, taken along lines 4—4 of FIG. 1.

Referring now in more detail to the drawing, in which like numerals indicate like parts throughout the several views, FIG. 1 discloses an announcing system 7 of the type utilized to transmit messages to a telephone system and includes a main panel 8 suitable for mounting on a conventional skeletal framework (not shown). An electrical control section 9 is supported by main panel 8 and is usually closed by a cover, either transparent or opaque, and a mechanical section 10 is located below the electrical section. The mechanical section can also be closed by a transparent or opaque cover. A pair of upper and lower support brackets 12 and 13 are rigidly connected to the rear surface of main panel 8 (FIG. 4). Support brackets 12 and 13 function to stiffen main panel 8, and main panel 8 and its support brackets 12 and 13 form a support frame for the announcing system.

Driving motor 15 is positioned behind main panel 8 and its driving shaft (not shown) is located parallel to the main panel. Transmission 16 is connected to driving motor 15 and drive shaft 18 extends from transmission 16 through an opening in main panel 8 to the front of the main panel. Driving motor 15 is rigidly connected to motor mounting plate 19. Motor mounting plate 19 is connected to motor support bracket 20 by means of cap screws 21 which extend through elongated mounting slots 22 in motor mounting plate 19. The arrangement is such that motor mounting plate 19 is slidable in a horizontal direction with respect to motor support bracket 20. Motor support bracket 20 is generally C-shaped and includes central portion 24 disposed parallel to main panel 8 and motor mounting plate 19, and rearwardly extending upper and lower flanges 25 and 26. Motor support bracket 20 is connected to upper and lower support brackets 12 and 13 by means of flexible vibration absorption mountings 28 and 29. Upper mountings 28 are usually maintained in tension while lower mountings 29 are usually maintained in compression and the vibrations from the motor are absorbed through shear action of the mounts 28 and 29, which are laterally offset from panel 8. Thus, the mountings 28 and 29 function as vibration dampening means so as to isolate the vibrations of driving motor 15 and its transmission 16 from main panel 8 and its related elements.

Driving pulley 30 is rigidly connected to driving shaft 18 by means of a set screw, and the driving pulley is substantially cylindrical with outwardly flared end flanges 31 and 32. The cylindrical portion of the driving pulley is knurled so as to provide a belt driving surface.

At the other end of main panel 8 driven pulley assembly 34 is mounted which includes bearing housing 35, driven pulley shaft 36, driven pulley 38, and flywheel 39. Shaft 36, driven pulley 38 and flywheel 39 are rigidly connected to each other and bearing housing 35 is connected to main panel 8 so that flywheel 39 is positioned behind the main panel while driven pulley 38 is positioned in front of the main panel. Pulley shaft 36 rotates on an axis substantially parallel to the axis of rotation of driving shaft 18 of driving pulley 30 and driven pulley 38 and driving pulley 30 are located in a common plane approximately parallel to main panel 8. Driven pulley 38 is also generally cylindrical in shape and includes end flanges 40 and 41 and its cylindrical surface is knurled. Flywheel 39 functions as a belt surge dampening or eliminating means, as will be explained herein.

Endless record belt 42 extends about driving pulley 30 and driven pulley 38 and functions as an endless belt recording medium. Record belt 42 is usually maintained in tension and the tension of the belt can be adjusted by loosening the screws 21 which connect motor mounting plate 19 to motor support bracket 20, and by sliding driving motor 15, transmission 16, driving shaft 18 and driving pulley 30 toward or away from driven pulley 38. Screws 21 are retightened when driving pulley 30 is properly located.

In this embodiment of the invention, the speed of rotation of driving pulley 30 and the length of the record belt 42 are such that the record belt 42 will make one complete passage about driving and driven pulleys 30 and 38 in fourteen seconds. Of course, other belt lengths, pulley speeds and time cycles can be utilized, if desired.

Figure 6:
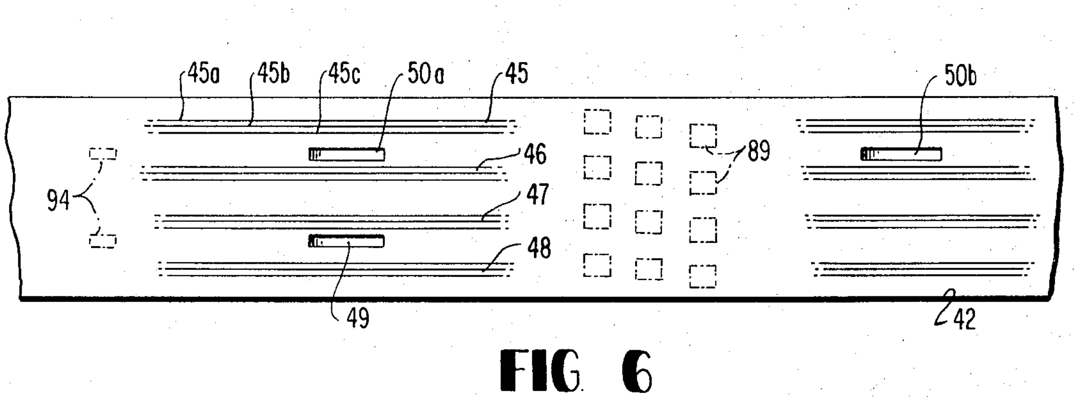
FIG. 6 is a schematic illustration of the record belt.

As is illustrated in FIG. 6, record belt 42 has four groups of recorded message or message tracks imposed thereon: group 45 adjacent one edge of record belt 42, groups 46 and 47 on opposite sides of the centerline of the record belt, and group 48 adjacent the opposite edge of the record belt. Each group of messages includes three individual message tracks, such as message tracks **45*a*, 45*b* and 45*c* of group 45, so that a total of twelve message tracks are provided along the length of record belt 42. Belt surface depressions are defined in the record belt between the groups of message tracks. For instance, belt surface depression 49 is positioned between message track groups 47 and 48, while belt surface depressions 50*a* and 50*b* are in alignment with each other along the length of record belt 42 and are displaced laterally from surface depression 49. Depressions 50*a* and 50*b* are located between message track groups 45 and 46**. The number of and placement of the belt surface depressions can be varied as may be desired, and the belt surface depressions function as detectable portions of the belt for the purpose of connecting and disconnecting a telephone system to the announcing system, as will be explained more fully hereinafter.

Figure 3:
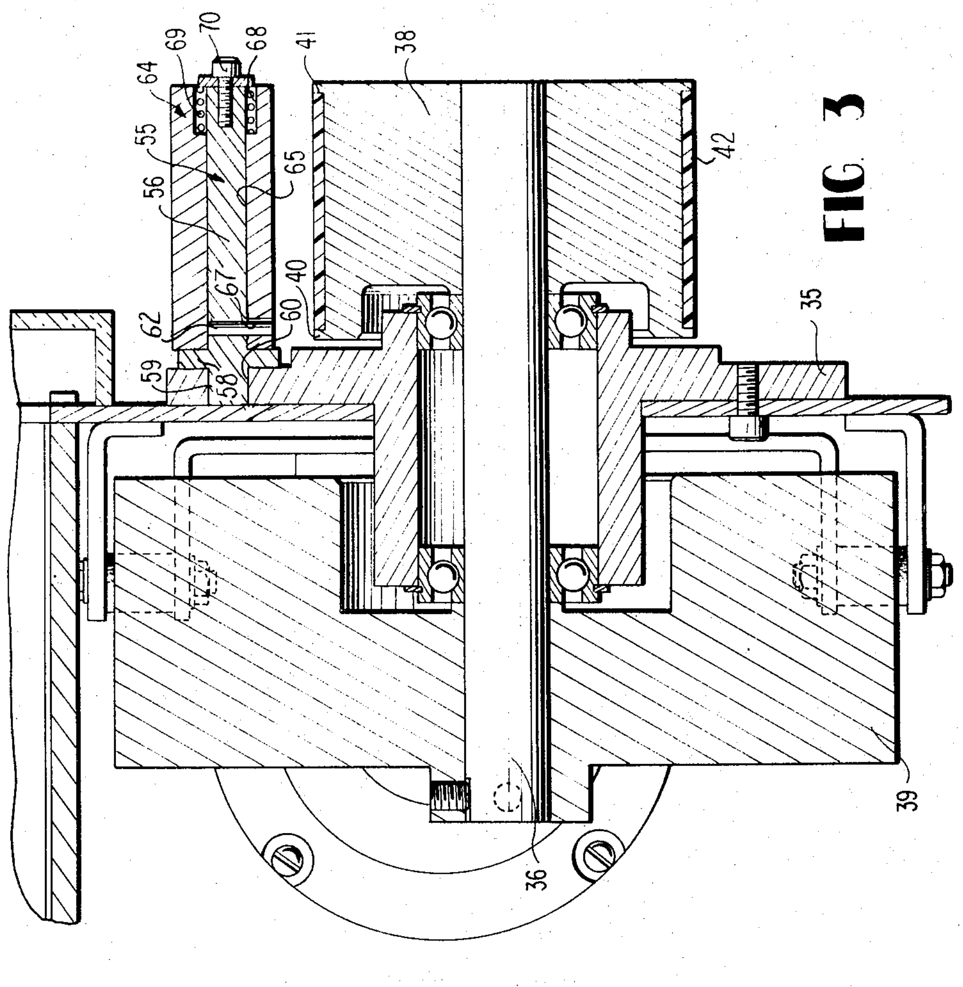
FIG. 3 is an end view of the announcing system, taken along the lines 3—3 of FIG. 1.

As is illustrated in FIG. 1, a plurality of banks of heads 51, 52 and 53 are positioned adjacent driven pulley 38 and are supported about the edge of bearing housing 35. Each bank of heads 51 includes a head mounting post 55 (FIGS. 3 and 5) which includes cylindrical stem 56, flange 58 and base 59. The outer end of each stem 56 is internally bored and threaded at 57 and base 59 fits into an opening 60 of bearing housing 35 and is retained therein by screws 61 which extend through flange 58 and into housing 35. Alignment pin 62 protrudes from stem 56 for the purpose of keeping head mounting bar 64 properly seated thereon.

Head mounting bar 64 is generally of elongated rectangular configuration and defines an internal bore 65 which is of a diameter sufficient to fit about stem 56 of head mounting post 55. A portion 66 of the end of head mounting bar 64 adjacent the flange 58 of mounting post 55 is undercut and includes recess 67 which conforms in shape with alignment pin 62 of stem 56. The opposite end of head mounting bar 64 is counterbored at 68 and coil compression spring 69 is received in the counterbore and retained therein by means of cap screw 70 and washer 70a. Screw 70 is received in the threaded bore 57 of stem 56 of head mounting post 55. Spring 69 tends to urge head mounting bar 64 toward flange 58 of head mounting post 55 and when recess 67 is in alignment with alignment pin 62 of flange 58, head mounting bar 64 will be properly seated against flange 58 of head mounting post 55. Head mounting bar 64 can be pulled away from head mounting post 55 against the bias of spring 69 until its recess 67 clears alignment pin 62 and then rotated to turn the head mounting bar with respect to head mounting post 55, and the undercut portion 66 of head mounting bar 64 will accommodate alignment pin 62 and limit the amount of rotation of head mounting bar 64 to about 90 degrees. Spring 69, alignment pin 62, recess 67 and their related components function as positioning means for locking the head mounting bar in a predetermined position on the head mounting post.

Head mounting bar 64 includes a wedge-shaped mounting protrusion 71 which extends along its length on one side thereof. The outer face of the mounting protrusion comprises a series of slots and ridges 72 and 74 and the edges of the slots and ridges are undercut and define inwardly sloped upper and lower surfaces 75 and 76. Reading head assemblies 77 are attached to head mounting bars 64 at spaced intervals along the length of the mounting bars. Each reading head assembly includes a head base 78 and its bar clamp 79 which are arranged as clamp means to grip head mounting bar 64, leaf spring 86, reading head shoe 88, and reading head 89. Head base 78 includes inwardly extending flange 80 with an upwardly tapered shelf 81 which is angled to engage the undercut inwardly sloped lower surface 76 of head mounting bar 64, while bar clamp 79 is thicker than the upper portion of head base 78 and includes an overhang having a downwardly tapered shelf 82 for engagement with the undercut inwardly sloped upper surface 75 of head mounting bar 64. The rear portion of bar clamp 79 is sloped downwardly, and the rear portion of the upper edge of head base 78 is beveled to a corresponding angle. Screw 84 connects bar clamp 79 to head base 78 and the angles of the lower surface of bar clamp 82 together with the angles of head base 78 function as clamp means to urge head base 78 flat against the surface of a slot 72. The width of the head base and bar clamp 79 correspond to the width of slots 72, so that each head base and its bar clamp 79 will be properly positioned adjacent head mounting bar 64 when screw 84 is tightly threaded into bar clamp 79 and head base 78.

Figure 5:
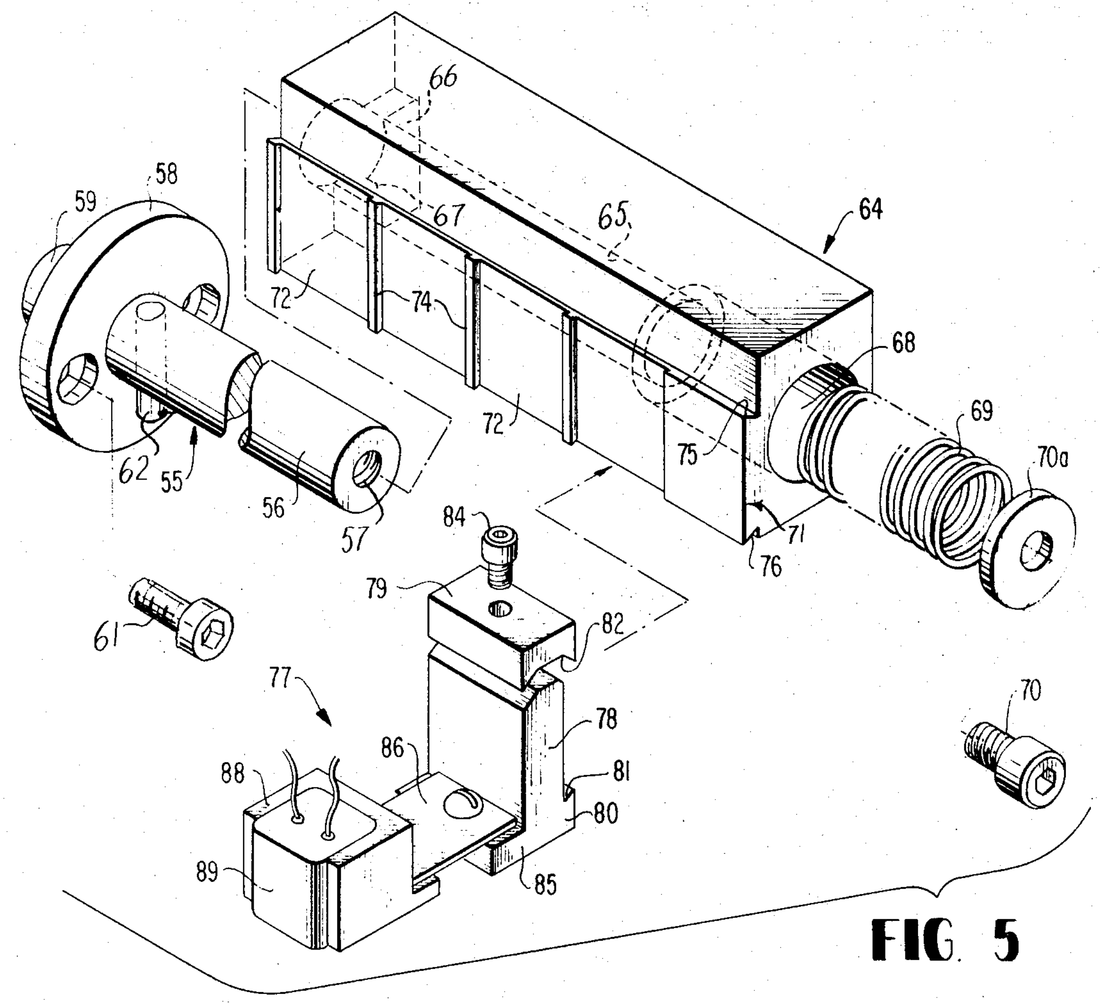
FIG. 5 is an exploded perspective view of the head assembly and its head mounting bar.

The lower portion of head base 78 includes an outwardly extending support flange 85, and leaf spring 86 is rigidly connected at one of its ends to support flange 85. Reading head shoe 88 is rigidly connected to the opposite end of leaf spring 86, and reading head 89 is located within the confines of shoe 88. While only one head assembly 77 is shown in FIG. 5, it will be understood that a head assembly can be mounted in each slot 72 of head mounting bar 64.

In order that the reading heads 89 of each bank of heads be laterally offset across the record belt from a head of another bank of heads, the flange 58 of each head mounting post 55 is of a different thickness, and it is this varying thickness that causes the entire head mounting bar of each bank of heads to be laterally displaced across the width of the record belt from the other banks of heads.

When a head assembly 77 is first assembled, the workman mounts the head base on an instrument that has a mounting arrangement similar to the head mounting bar 64, and the location and attitude of the reading head 89 is adjusted by the workman so that it is properly located with respect to his instrument. All of the head assemblies are adjusted in this manner before they are connected to a head mounting bar on the announcing system. Thus, when a head assembly 77 does reach an announcing system where it is to be put to use, the workman merely loosens screw 84 and allows bar clamp 79 to move away from head base 79, he then urges the head base in a slot 72 between adjacent ridges 74 on the head mounting bar and places the upwardly tapered shelf 81 of the head base in engagement with the undercut inwardly lower surface 76 of the mounting protrusion 71, and retightens screw 84 which urges the sloped surface 82 of the bar clamp down into the undercut inwardly sloped upper surface 75 of the mounting protrusions 71. This accurately mounts the reading head 89 with respect to the announcing system, particularly with respect to the driven pulley 38 and the record belt 42 extending around the driven pulley. In order that the workman has easy access to the head mounting bar 64, the head mounting bar can be pulled in a direction away from main panel 8 and rotated to lift the head assemblies 77 away from the driven pulley 38. After the adjustments, etc., have been made, the workman then rotates the head mounting bar 64 in the opposite direction until the recess 67 of the mounting bar registers with the alignment pin 62, whereupon the coil compression spring 69 will urge the head mounting bar 64 back to its operating position with all of the reading heads 89 in the bank of head assemblies in proper alignment with the record tracks on the record belt 42.

As is illustrated in FIGS. 1 and 4, a microswitch assembly 90 is mounted adjacent driving pulley 30. Microswitch assembly 90 is supported from motor mounting plate 19, so that the mounting relationship between driving pulley 30 and microswitch assembly 90 is retained during adjustment of belt tension. Microswitch assembly 90 includes a pair of levers 91 which extend from the switch housing and rollers 94 are located at the ends of the levers and engage record belt 42 on driving pulley 30. Since microswitch assembly 90 and driving pulley 30 both derive their support from motor moutning plate 19, there will be very little relative motion due to motor vibration between microswitch assembly 90 and driving pulley 30. Thus, the vibration from the driving motor and transmission will not affect the function of microswitch 90.

As is illustrated in FIG. 6, the depressions **49, 50*a* and 50*b* in the surface of record belt 42 register with the rollers 94 of microswitch 90 as the depressions move with record belt 42 about driving pulley 30. The average thickness of record belt 42 is approximately one-eighth inch while the depressions are approximately one-sixteenth inch deep. Thus, the rollers 94 of microswitch assembly 90 will drop approximately one-sixteenth of an inch when the belt depressions pass around driving pulley 30** causing momentary operation of the switches.

Upper and lower record belt wipers 95 and 96 are connected to main panel 8 on opposite sides of the upper flight of record belt 42. Wipers 95 and 96 each include a wiper bracket 97 which support a pair of wiper holders 98 and 99, and the wiper holders are maintained in spaced relationship by spacer washer 100. Soft porous material 101, such as felt or other suitable material, is gripped by holders 98 and 99 as they are clamped together by means of screw 102. The material of the record belt wipers extend toward record belt 42 as a cantilever and the length of the soft material is sufficient to lightly engage the flat surfaces of record belt 42. The material of each record belt wiper is saturated with a lubricant suitable for cleaning and lubricating the record belt. Also, the record belt wipers function to dampen the oscillations of the record belt.

OPERATION

When the announcing system is placed in operation, driving motor 15 is energized to cause driving pulley 30 to rotate. The rotation of driving pulley 30 causes record belt 42 to move about and drive driven pulley 38. Flywheel 39 is of a relatively large mass and tends to stabilize the rotation of driven pulley 38 as it is brought up to speed by driving pulley 30. The mass of flywheel 39 is gaged so that it is sufficient to cause driven pulley 38 to rotate at a substantially uniform angular velocity in spite of the normal surges in the rotation of driving pulley 30 which are transmitted from driving motor 15 and transmission 16 through driving pulley 38 to record belt 42. Thus, flywheel 39 functions as a belt surge eliminator means or as a belt surge dampening means. The flexible vibration absorption mountings 28 and 29 function as dampening means to substantially isolate the motor vibrations from main panel 8 and the vibrations are not transmitted to driven pulley 38. Therefore, virtually no belt surging or vibrations are encountered by the reading heads positioned about driven pulley 38. Thus, the announcement transcribed by the reading heads will not be distorted from vibrations and surges from motor 15 and transmission 15.

If it is desired to adjust or replace one or more of the head assemblies 77, the operator merely pulls the head mounting bar 64 away from main panel 8 until the recess 67 of the head mounting bar clears alignment pin 62 of the head mounting post and he then rotates the head mounting bar so that the reading heads are moved away from the record belt. The head assemblies 77 can be removed from and attached to the head mounting bar, or other adjustments can be made as may be desired.

As is illustrated in FIG. 6, each reading head 89 of the first bank of heads is laterally offset from the other reading head in the other banks of heads so that one reading head is maintained in alignment with one recording track. Moreover, one reading head of each bank of reading heads functions to follow a recording track in each group of recording tracks.

The surface depressions 49 and 50 in the record belt are utilized to actuate the switches of microswitch assembly 90 by the rollers 94 moving downwardly into and then upwardly out of the surface depressions of the record belt as the record belt moves about driving pulley 30. The driving pulley functions to stablize the record belt so that microswitch assembly 90 will accurately read the surface depressions, and since microswitch assembly 90 and the driving pulley 30 both derive their support from motor mounting plate 19, the vibrations of the motor and transmission will not function to affect the microswitch assembly. The microswitch assembly functions to connect and disconnect telephone lines to the reading heads of the announcing systems in a conventional manner. In order that announcements of different time durations can be read, two or more surface depressions 50*a* and 50*b* can be spaced along the length of the record belt in alignment with a single roller 94 of the microswitch assembly, causing several telephone connects and disconnects to be made during one cycle of the record belt. For instance, the present invention has a belt cycle of fourteen seconds and if the microswitch assembly reads two belt surface depressions equally spaced along the length of the record belt, two seven second announcements can be broadcast to the telephone system during the cycle of the record belt. Of course, for longer announcements the belt surface depressions would be spaced further apart, or only a single belt surface depression could be utilized. Moreover, for announcements longer than fourteen seconds in duration, the microswitch assembly or the electrical portion of the announcing system can be arranged to connect several reading heads to a single telephone connection in sequence so that the listener would receive a fourteen second message read by one reading head and then be switched to another reading head for a continuation of the message. Control circuitry for enabling plural message segments to be sequentially delivered in response to the operation of switches correlated with recording medium movement, and for delivering such messages to a telephone system, are known to persons skilled in the art and are exemplified by U. S. Pat. No. 2,285,425.

While belt surface depressions 49, 50*a* and 50*b* have been illustrated as detectable portions of the record belt, the record belt can include various other detectable portions, such as edge notches, holes, or spots which reflect light or conduct electricity. Moreover, while the invention has been generally disclosed as a means for broadcasting announcements to a telephone system, the invention can be used in connection with other systems, and the messages imposed on the record belt can be erased and re-recorded by using the reading heads 89 as recording heads by means of conventional circuitry. Also, this invention has been described in detail with particular reference to preferred embodiments thereof, but it will be understood that variations and modifications can be effected within the spirit and scope of the invention as described hereinbefore and as defined in the appended claims.

We claim:

1. In an audio announcing system, the improvement comprising a driving pulley, a driven pulley, said driving and driven pulleys each having a flat annular belt receiving periphery, an endless record belt aving an outer surface and an inner surface each of which is substantially flat, said endless record belt being of resilient material and extending in tension about said driving pulley and said driven pulley with said flat inner surface in driven engagement with said driving pulley and

2. An audio announcing system for use with a telephone system or the like comprising a support frame, vibration dampening means supported by said support frame, a driving motor supported by said vibration dampening means in spaced relation with said support frame for isolating the motor vibrations from said support frame, a driving pulley connected to said driving motor, a driven pulley positioned in approximately the same plane as said driving pulley and rotatably supported by said support frame on an axis approximately parallel to the axis of rotation of said driving pulley, said driven and driving pulleys each having a flat annular belt receiving periphery, a flywheel connected to and rotatable with said driven pulley, an endless belt recording medium having an outer surface and an inner surface each of which is substantially flat, said endless belt being of resilient material and extending in tension around said driving pulley and said driven pulley with said flat inner surface in driven engagement with said driving pulley and in driving engagement with said driven pulley, a plurality of messages recorded along the length of said outer surface of said endless belt recording medium, at least one of said messages being substantially parallel with the length of said belt, a plurality of reading heads positioned at said driven pulley and disposed in message reading relation with the portion of the endless belt recording medium which passes around the driven pulley, said endless belt recording medium including a detectable portion positioned in fixed predetermined relation to said at least one recorded message, and detecting means positioned adjacent said endless belt recording medium and operative to detect the movement of said detectable portion of said endless belt recording medium with said endless belt recording medium.

3. The audio announcing system of claim 2 and wherein said detectable portion of the endless belt recording medium comprises at least one surface depression, and wherein said detecting means comprises switch means supported by said vibration dampening means and operative to detect the movement of said surface depression about said driving pulley.

4. In an audio output system, a driving pulley, a driven pulley, said driving and driven pulleys each having a flat annular belt receiving periphery, an endless belt recording medium having an outer surface and an inner surface each of which is substantially flat, said endless belt recording medium being of resilient material and extending in tension about said driving pulley and said driven pulley with said flat inner surface in driven engagement with said driving pulley and in driving engagement with said driven pulley, at least one reading head positioned adjacent said driven pulley and disposed in message reading relation with said endless belt recording medium which passes about the driven pulley, a support frame, said endless belt recording medium being a magnetic recording medium and said outer surface comprising a message recording surface facing outwardly of said pulleys, said reading head comprising a magnetic transducer head disposed to contact said message recording surface at a location whereat said endless belt passes about and drives said driven pulley, said reading head being supported by said support frame, vibration dampening means supported by said support frame, a driving motor connected to said driving pulley and supported by said vibration dampening means for isolating the motor vibrations from said support frame, and a flywheel connected to and rotatable with said driven pulley, said flywheel and driven pulley being supported by said support frame.

5. The audio output system of claim 4, wherein said endless belt recording medium includes four groups of message tracks disposed thereon extending along the length of and spaced apart from each other across the width of said endless belt recording medium, with each group of message tracks comprising three message tracks spaced across the width of said endless belt recording medium, and wherein said at least one reading head comprises three banks of reading heads spaced about the perimeter of said driven pulley, with each bank of reading heads positioned adjacent a corresponding group of message tracks and including reading heads disposed in message reading relation with a corresponding message track from each group of message tracks on said endless belt recording medium.

6. The audio output system of claim 4 and wherein said endless belt recording medium contains at least one message recorded on a message track which is substantially parallel with the length of the endless belt and includes at least one surface depression in said endless belt positioned in fixed predetermined relation to said recorded message, and further including switch means positioned adjacent said driving pulley and operative to detect the surface depression as the surface depression moves with said endless belt recording medium about said driving pulley.

7. The audio output system of claim 6 and wherein said endless belt recording medium comprises at least two surface depressions spaced along its length and equally spaced from one edge of said endless belt recording medium, a third surface depression laterally spaced from said at least two surface depressions, first switch means positioned at said driving pulley and operative to detect said at least two surface depressions as said at least two surface depressions move with said endless belt recording medium about said driving pulley, and second switch means positioned at said driving pulley and operative to detect said third surface depression as said third surface depression moves with said endless belt recording medium about said driving pulley.

* * * * *

UNITED STATES PATENT OFFICE
CERTIFICATE OF CORRECTION

Patent No. 3,787,637 Dated January 22, 1974

Inventor(s) John O. McCarty and Leary W. Smith

It is certified that error appears in the above-identified patent and that said Letters Patent are hereby corrected as shown below:

Claim 1 should read:

1. In an audio announcing system, the improvement comprising a driving pulley, a driven pulley, said driving and driven pulleys each having a flat annular belt receiving periphery, an endless record belt having an outer surface and an inner surface each of which is substantially flat, said endless record belt being of resilient material and extending in tension about said driving pulley and said driven pulley with said flat inner surface in driven engagement with said driving pulley and in driving engagement with said driven pulley, reading means for reading the record belt as the record belt moves about said driven pulley, dampening means contacting said record belt at a location intermediate said driving and driven pulleys for isolating the vibrations of said driving pulley from said driven pulley, and surge eliminating means operatively connected with said driven pulley for eliminating the surges of said driving pulley from said driven pulley.

Signed and sealed this 14th day of May 1974.

(SEAL)
Attest:

EDWARD M.FLETCHER,JR.
Attesting Officer

C. MARSHALL DANN
Commissioner of Patents